United States Patent
Yoshikawa et al.

(10) Patent No.: US 8,752,276 B2
(45) Date of Patent: Jun. 17, 2014

(54) METHOD OF MANUFACTURING ROTATING ELECTRICAL MACHINE

(75) Inventors: Toshiyuki Yoshikawa, Toyota (JP); Satoru Hara, Anjo (JP)

(73) Assignee: Denso Corporation, Kariya (JP)

( * ) Notice: Subject to any disclaimer, the term of this patent is extended or adjusted under 35 U.S.C. 154(b) by 248 days.

(21) Appl. No.: 13/355,861

(22) Filed: Jan. 23, 2012

(65) Prior Publication Data

US 2012/0186072 A1    Jul. 26, 2012

(30) Foreign Application Priority Data

Jan. 25, 2011  (JP) .................................. 2011-012714

(51) Int. Cl.
*H02K 15/00*    (2006.01)

(52) U.S. Cl.
USPC .................... 29/596; 29/598; 29/604; 29/606

(58) Field of Classification Search
USPC ......... 29/596, 598, 604, 606, 732; 123/192.1, 123/198 R; 464/89; 474/69, 70, 74, 135
See application file for complete search history.

(56) References Cited

U.S. PATENT DOCUMENTS

| 5,405,296 | A | * | 4/1995 | Cerny et al. ................... 474/135 |
| 5,517,957 | A | * | 5/1996 | Wagner et al. ............. 123/192.1 |
| 6,083,130 | A | * | 7/2000 | Mevissen et al. ............... 474/70 |
| 2006/0035736 | A1 | | 2/2006 | Umeda et al. |

FOREIGN PATENT DOCUMENTS

| JP | A-6-339596 | 12/1994 |
| JP | A-10-250712 | 9/1998 |
| JP | A-2006-46571 | 2/2006 |

* cited by examiner

*Primary Examiner* — Thiem Phan
(74) *Attorney, Agent, or Firm* — Oliff PLC

(57) ABSTRACT

A method of manufacturing a rotating electrical machine has steps of a preparation step that accommodates the cap in a jig space while bringing the jig and the pulley in contact in an up-and-down direction so that an operation space is sealed, and a main step that decompresses the operation space to pressure lower than atmospheric pressure, moves the cap to an upper side in the decompressed operation space, and press-fits the cap into the pulley. By this, an inclination and a misalignment in the axial direction of the cap by the action of the reaction force can be suppressed since the reaction force acting downwardly on the cap can be weakened compared with the case where the cap is press-fit under atmospheric pressure. Therefore, the press-fit-state of the cap can be stabilized.

2 Claims, 4 Drawing Sheets

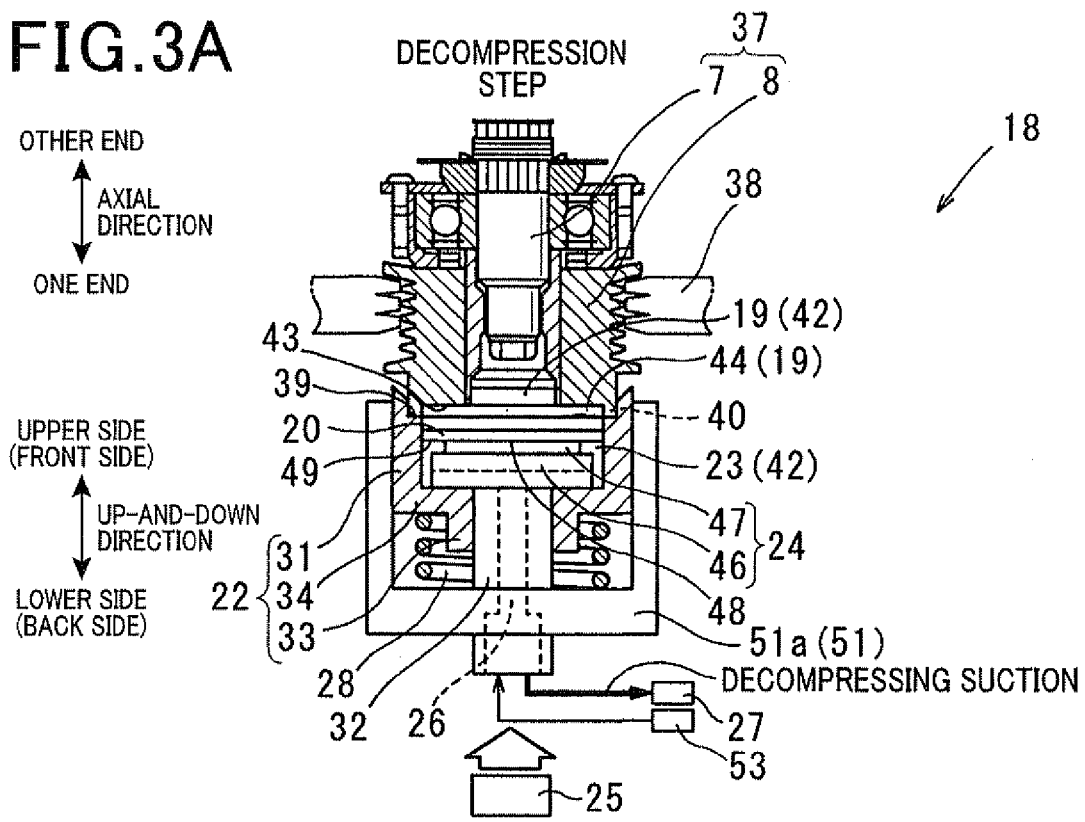
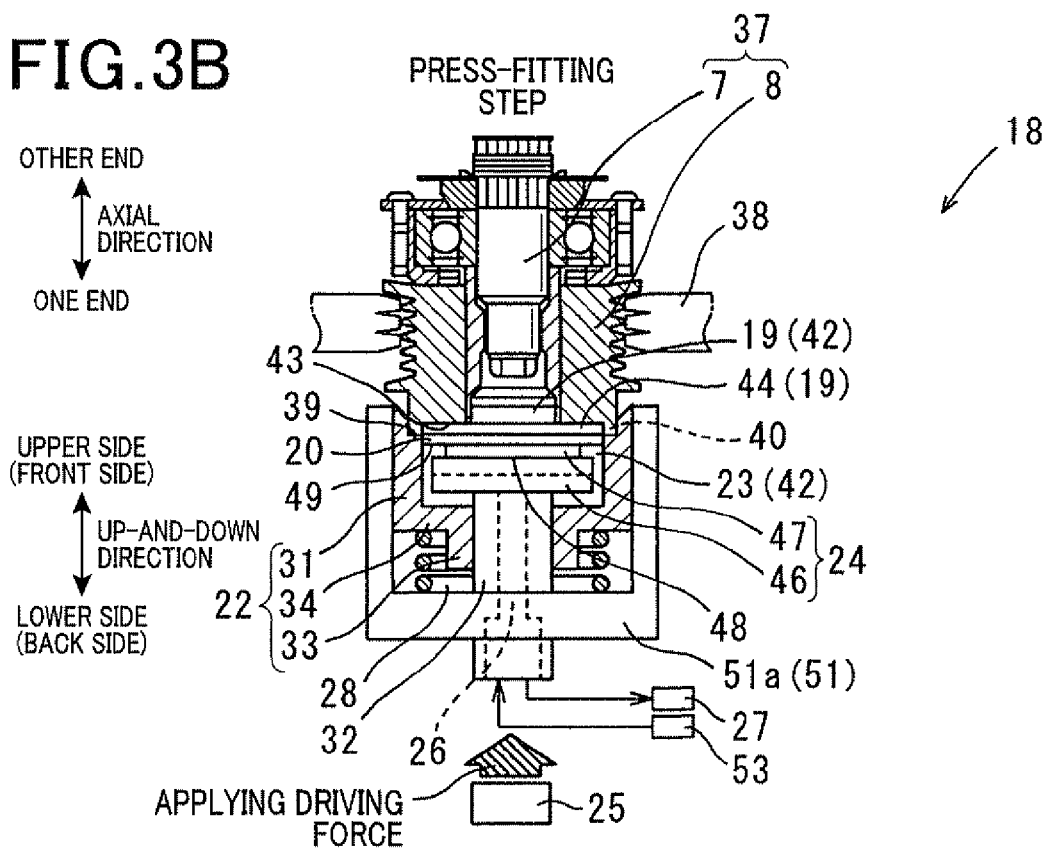

(A-A)

METHOD OF MANUFACTURING ROTATING ELECTRICAL MACHINE

CROSS-REFERENCE TO RELATED APPLICATION

This application is based on and claims the benefit of priority from earlier Japanese Patent Application No. 2011-12714 filed Jan. 25, 2011, the description of which is incorporated herein by reference.

TECHNICAL FIELD

The present disclosure relates to a method of manufacturing a rotating electrical machine and a device for manufacturing the same, and relates particularly to the method of manufacturing the rotating electrical machine and the device for manufacturing the same that can be used suitably for manufacturing AC generators for vehicles, for example.

BACKGROUND

AC generators for vehicles equipped with a pulley fastened on one axial end of a shaft and running torque is transmitted to the shaft from an internal-combustion engine through the pulley are well-known in general, for example.

Moreover, the pulley has an approximately cylindrical space that opens to the one end in the axial direction of the shaft (refer to drawings of Japanese Patent Application Laid-Open Publication No. 2006-046571), and a nut etc. used for fastening the shaft and the pulley are accommodated in the space (hereafter called the pulley space).

By the way, although the pulley space is covered by, for example, press-fitting a plate-like cap, a misaligning of the cap at the time of press-fitting is likely.

That is, there is a possibility that a press-fit-state of the cap may become unstable by an inclining or a misaligning of the cap in a depth direction (i.e., an axial direction of the shaft: hereafter called the axial direction) of the pulley space.

Therefore, manufacturing of the rotating electrical machine requires methods, equipment, etc. that can suppress the inclination and misalignment of the cap at the time of press-fitting the cap into the pulley.

In addition, Japanese Patent Application Laid-Open Publication No. 10-250712 discloses a technical idea that forms a female screw in an opening edge of a space, while a male screw is formed in a plug that blocks the opening of the space, and the plug is screwed lightly into the opening edge so that the plug is in a temporary fixed state.

According to the technical idea of '712, since the position, etc, of the plug are stabilized by screw-fastening with the application of the technical idea of '712, the inclination and misalignment of the cap can be suppressed on the opening edge of the pulley space of the rotating electrical machine and the cap.

However, since the steps of forming the screw in the opening edge of the pulley space and the cap, and the step of screw-fastening of the cap to the opening edge are required, the manufacturing steps become complicated.

SUMMARY

An embodiment provides a method of manufacturing a rotating electrical machine and a device for manufacturing the same that stabilizes a press-fit state of a cap without making manufacturing steps of the rotating electrical machine complicated.

In a method of manufacturing a rotating electrical machine according to a first aspect, the rotating electrical machine has a pulley fastened on one axial end of a shaft, the pulley has an approximately cylindrical pulley space that opens on one axial end, and the pulley space is covered by a plate-like cap.

The method has preparation step that accommodates the cap in a jig space formed so as to have an opening by a prescribed jig while bringing the jig and the pulley in contact so that an operation space where the pulley space and the jig space are combined is sealed, and a main step that decompresses the operation space to a pressure lower than atmospheric pressure, moves the cap towards the pulley space in the decompressed operation space, and press-fits the cap into the pulley.

Reaction force acts on the cap toward an opposite side to where the cap approaches in connection with the pressure increase of the pulley space when the cap moves to an upper side and approaches to the pulley space. This reaction force becomes larger as the cap approaches the pulley space.

In addition, it is considered that the cap inclines or misaligns in an axial direction by an action of the reaction force.

Then, the operation space that includes the pulley space and the jig space is formed and the operation space is decompressed to the pressure lower than atmospheric pressure.

Then, the cap is press-fit into the pulley in the decompressed operation space.

By this, an inclination and a misalignment in the axial direction of the cap by the action of the reaction force can be suppressed since the reaction force acting on the cap 20 can be weakened compared with the case where the cap is press-fit under atmospheric pressure. Therefore, the press-fit-state of the cap can be stabilized.

Moreover, the step of forming a closed operation space the step of decompressing operation space are much simpler compared with steps of disposing screws or screwing.

For this reason, a press-fit state of the cap can be stabilized without making manufacturing steps of the rotating electrical machine complicated.

In the method of manufacturing the rotating electrical machine according to a second aspect, the method further has a step of a post-treatment step that supplies a gas that has pressure higher than atmospheric pressure into the jig space after press-fitting the cap into the pulley.

In a device for manufacturing the rotating electrical machine according to a first aspect, the device includes a cylindrical jig that forms a jig space that has an opening, a receiving member accommodated in the jig space which receives the cap so that movement relative to the cylindrical jig becomes possible, a first driving means that drives at least one of the cylindrical jig and the pulley, and brings the cylindrical jig and the pulley approach, a second driving means that drives at least one of the receiving member and the pulley, and brings the receiving member and the pulley approach, and a sucking means that sucks gas from the jig space.

The operation space where the pulley space and the jig space are combined is sealed by bringing the cylindrical jig and the pulley in contact by the first driving means, and the operation space is decompressed to a pressure lower than atmospheric pressure by the sucking means, and the cap received in the receiving member is press-fit into the pulley by the second driving means in the decompressed operation space.

Moreover, the operation space where the pulley space and the jig space are combined is sealed by bringing the cylindrical jig and the pulley in contact by the first driving means.

Furthermore, the operation space is decompressed to the pressure lower than atmospheric pressure by the sucking means, and the cap received in the receiving member is press-fit into the pulley by the second driving means in the decompressed operation space.

In the device for manufacturing the rotating electrical machine according to a second aspect, regarding both sides of the cap that is received in the receiving member, assuming a side in the pulley side is a front side and a side in the receiving member side is a back side, a contacting region that contacts with the receiving member and a non-contacting region that does not contact with the receiving member are formed on the back side of the cap, and the contacting region is surrounded by the non-contacting region, and the sucking means sucks the gas in the operation space from the back side of the cap.

In the device for manufacturing the rotating electrical machine according to a third aspect, an inner circumferential diameter of the jig space is formed so as to substantially match with an outer circumferential diameter of the cap, and the passage that passes the gas between a front side and a back side of the cap is formed in the cylindrical jig.

In the device for manufacturing the rotating electrical machine according to a fourth aspect, there is provided a spring in which the driving force of the first driving means and the second driving means can be stored as stress, and the spring is compressed in an axial direction and increases an amount of accumulated stress during a period from when the cylindrical jig and the pulley are contacted until the cap is press-fit into the pulley.

BRIEF DESCRIPTION OF THE DRAWINGS

In the accompanying drawings:

FIG. 3A shows a sectional view of a decompression step in the embodiment;

FIG. 3B shows a sectional view of a press-fitting step in the embodiment;

DETAILED DESCRIPTION OF THE PREFERRED EMBODIMENTS

Composition of a Rotating Electrical Machine of an Embodiment

The composition of a rotating electrical machine 1 manufactured by a manufacturing method of an embodiment is explained based on the drawings.

Figure 1:
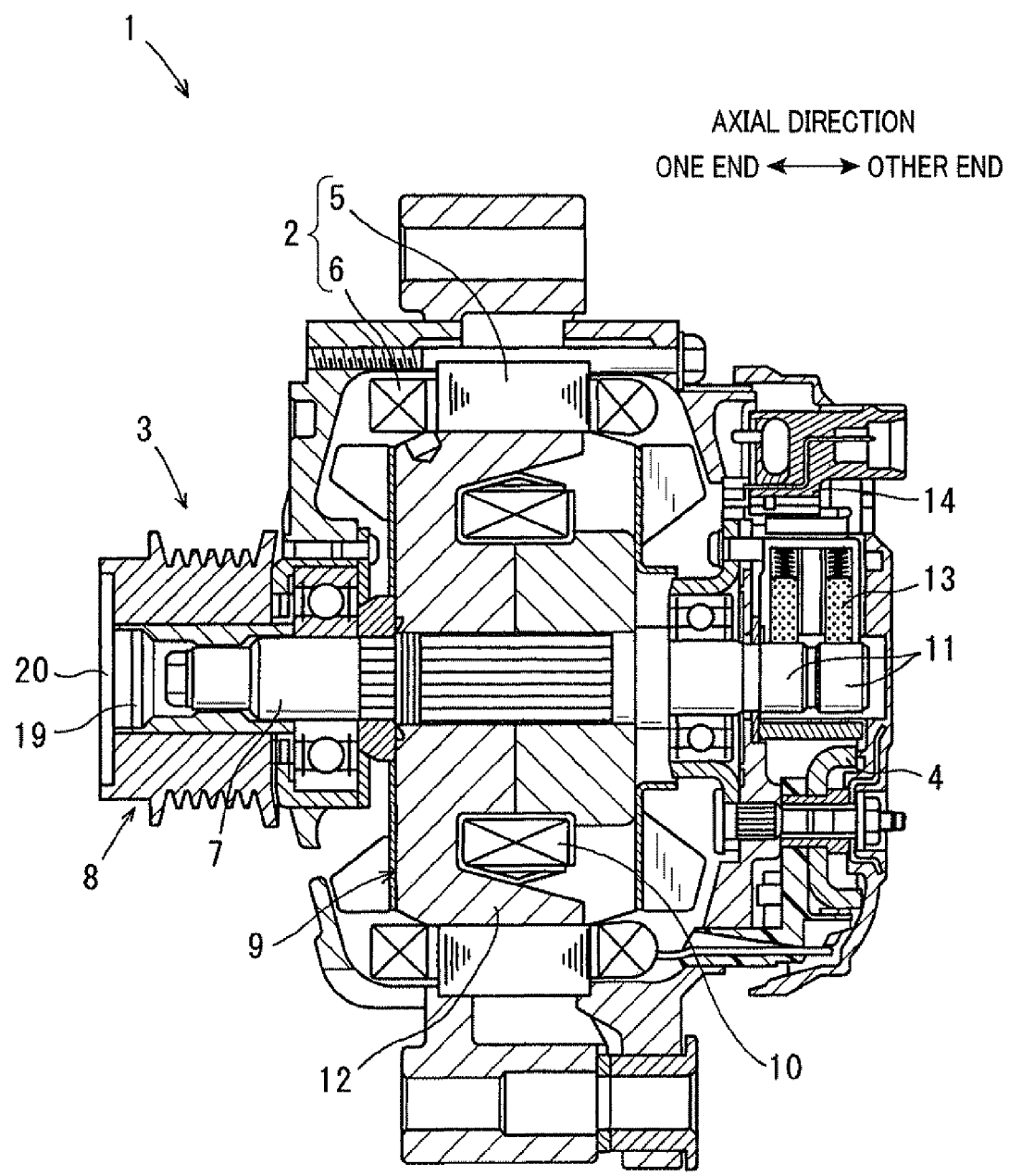
FIG. 1 shows a sectional view of a composition of a rotating electrical machine in an embodiment.

The rotating electrical machine 1 has, as shown in FIG. 1 for example, an armature as a stator 2 arranged at an outer circumference side and a magnetic field system as a rotor 3 arranged at an inner circumference side, and functions as an AC generator for vehicles that induces AC electromotive force in the armature by rotation of the magnetic field system.

Further, the AC electromotive force induced in the armature is converted into DC electromotive force by a rectifier 4, and is supplied to an in-vehicle power supply (not shown) etc.

Here, the stator 2 has an annular stator core 5 and an armature coil 6 wound around the stator core 5, for example.

Moreover, the rotor 3 has, for example, a shaft 7 as a rotation axis, a pulley 8 fastened at one end of the shaft 7 in an axial direction, a rotor core 9 fixed to an outer circumference of the shaft 7, a field coil 10 wound around the rotor core 9, and collector rings 11 disposed at another end of the shaft 7 in an axial direction that are electrically connected to the field coil 10.

The rotor core 9 is equipped with a plurality of nail-like magnetic poles 12 that have opposite polarity in a circumferential direction alternately.

Furthermore, a belt (not shown) is wound around the pulley 8 and rotating torque is transmitted thereto from an internal-combustion engine (not shown). Brushes 13 are disposed so as to slidably touch the collector rings 11, and the field coil 10 is energized from the in-vehicle power supply through the brushes 13 and the collector rings 11.

According to the composition mentioned above, a magnetic circuit over the stator core 5 and the rotor core 9 is formed when the rotor 3 rotates and the field coil 10 is energized, and since the magnetic circuit rotates so as to cut the armature coil 6, the AC electromotive force is induced in the armature coil 6.

In addition, a regulator 14 that controls an amount of energization to the field coil 10 is included in the rotating electrical machine 1, and the regulator 14 maintains the electromotive force obtained by the rotating electrical machine 1 at a proper value by controlling the amount of to energization to the field coil 10 according to a number of revolutions of the internal-combustion engine, for example.

Features of the Embodiment

Figure 2A:
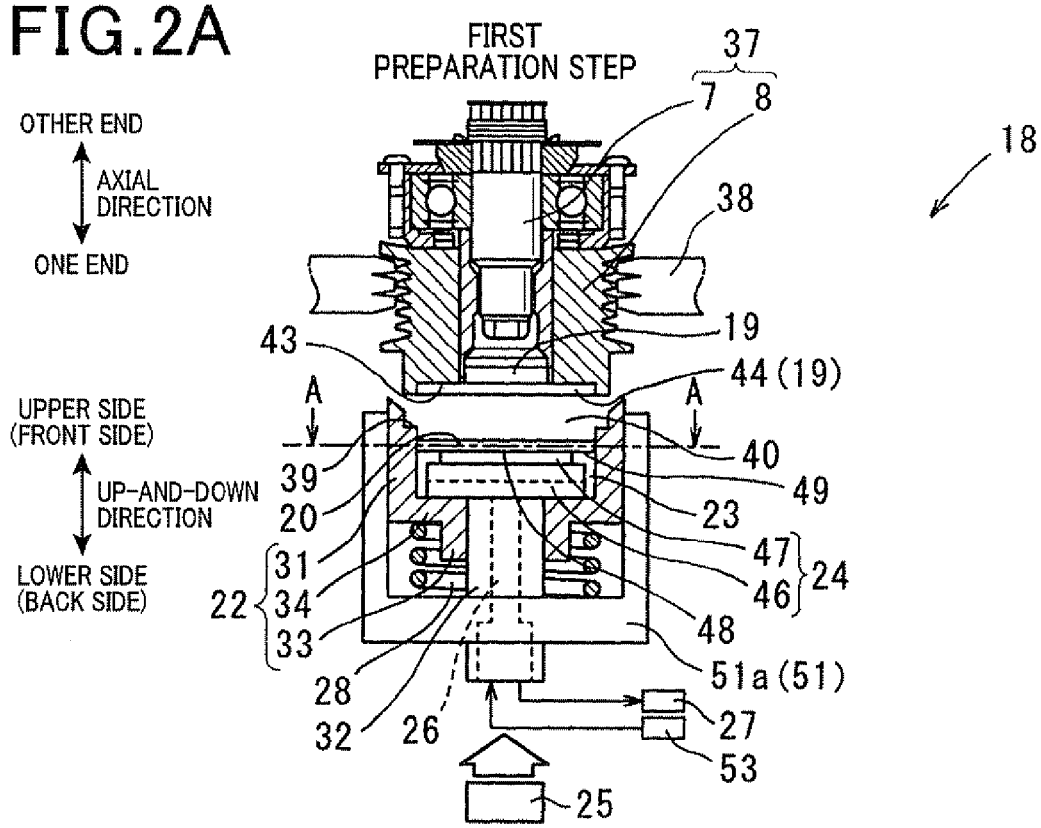
FIG. 2A shows a sectional view of a first preparation step in the embodiment.
Figure 2B:
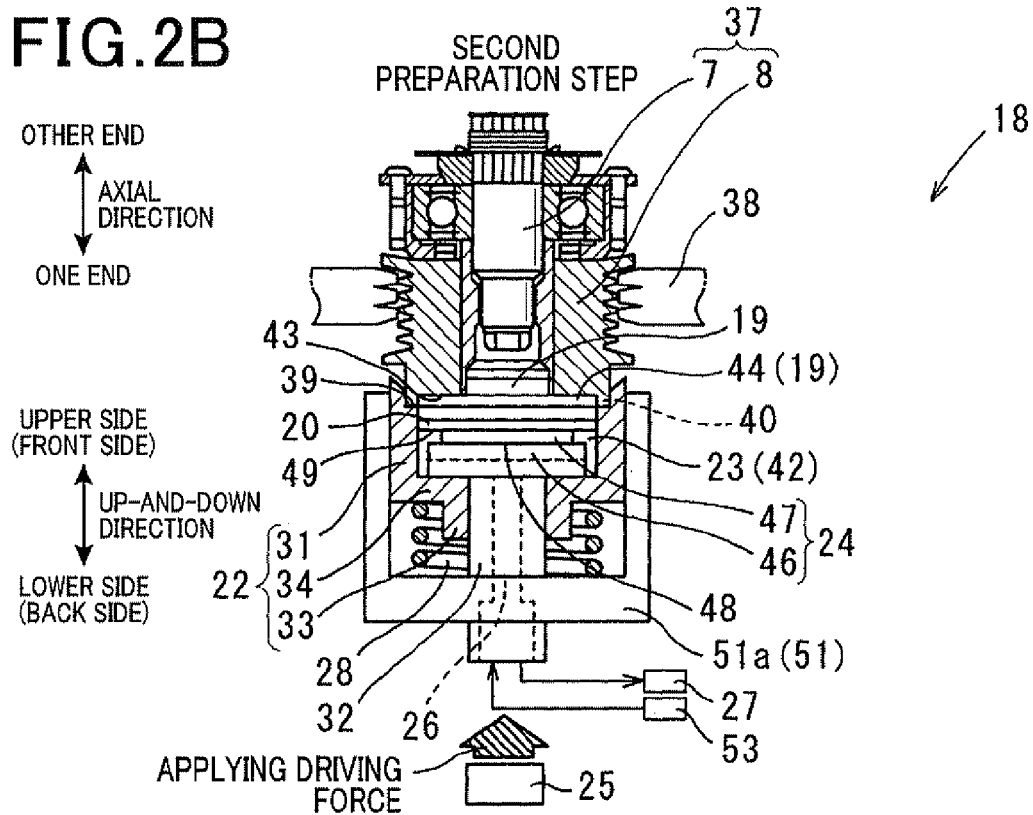
FIG. 2B shows a sectional view of a second preparation step in the embodiment.
Figure 4:
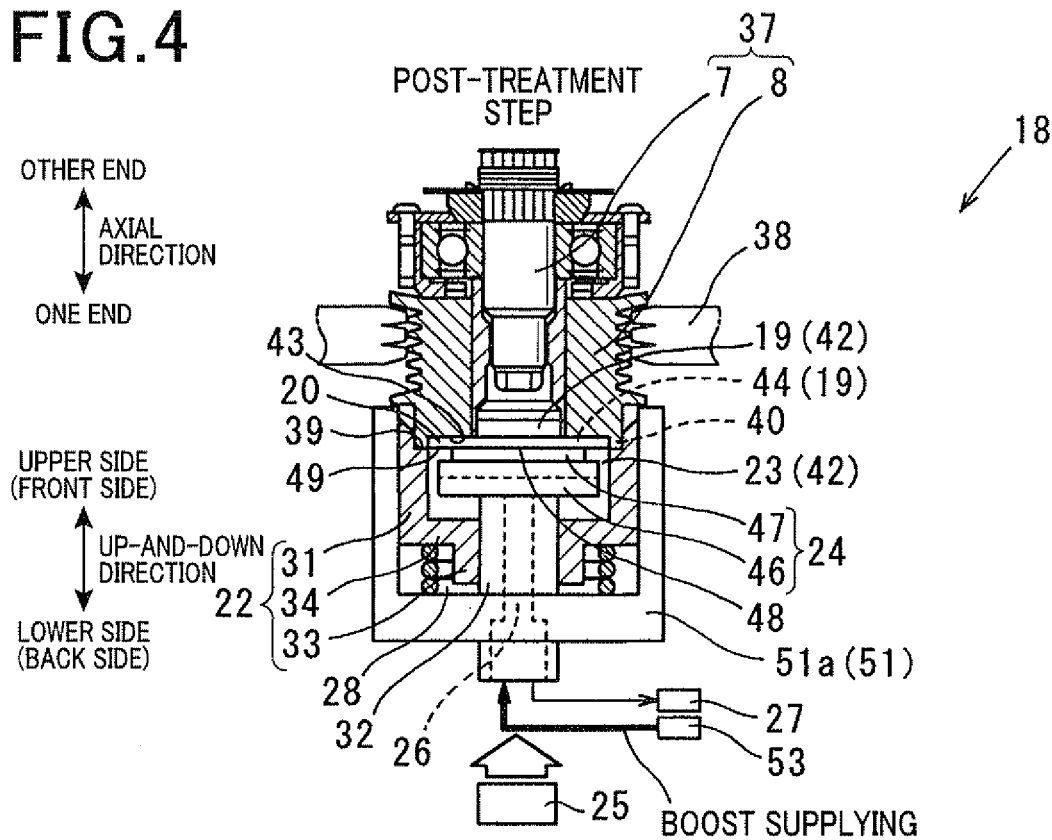
FIG. 4 shows a sectional view of a post-treatment step in the embodiment.

Features of the embodiment are explained based on a manufacturing device 18 for the rotating electrical machine 1 and the method of manufacturing the manufacturing device 18 using FIG. 2 to FIG. 4.

First, the pulley 8 of the rotating electrical machine 1 has a substantially cylindrical pulley space 19 that opens to one end side in an axial direction, and the pulley space 19 is blocked by press-fitting a plate-like cap 20 into the pulley 8.

In addition, the pulley space 19 is used for a screw-fastening of the shaft 7 and the pulley 8, and a tip of the shaft 7 is accommodated therein.

Next, the manufacturing device 18 for the rotating electrical machine 1 is equipped with the following composition in order to press-fit the cap 20 into the pulley 8.

Namely, the manufacturing device 18 has a cylindrical jig 22 (a space formed in the cylindrical jig 22 is hereafter called a jig space 23), a receiving member 24, a driving means 25, a sucking means 27, and a coil spring 28.

The cylindrical jig 22 forms a space that has an opening.

The receiving member 24 is accommodated in the jig space 23, and receives the cap 20 so that relative displacement becomes possible to the cylindrical jig 22.

The driving means 25 drives the cylindrical jig 22 and the receiving member 24.

The sucking means 27 sucks gas from the jig space 23 through a passage 26 leading to the jig space 23, The coil spring 28 can store a driving force of the driving means 25 as stress.

The cylindrical jig 22 has a large-diameter main body part 31 that forms the jig space 23, a guide part 33 disposed coaxially with the main body part 31 with a smaller diameter than that of the main body part 31 that slidably supports a sliding shaft part 32 of the receiving member 24, and an engaging part 34 that engages with the receiving member 24.

The cylindrical jig 22 is built into the manufacturing device 18 so that its axis center points in an up-and-down direction while the main body part 31 is disposed above the guide part 33, and the jig space 23 opens towards an upper side.

The diameter of the jig space 23 (an inner circumferential diameter of the main body part 31) is formed slightly larger than an outer circumferential diameter of the cap 20 so that in-/outflow of the gas between a front side and a back side of the cap 20 become possible (regarding the front and back of the cap 20, a side in an upper side is defined as the front side and a side in a lower side is defined as the back side).

Here, the manufacturing device 18 is equipped with a clamp jig 38 that holds and moves a shaft assembly 37, which is the pulley 8 fastened to the shaft 7.

Here, the shaft assembly 37 is arranged so that an axial direction of the shaft 7 points in the up-and-down direction, and so that the opening of the pulley space 19 faces the opening of the jig space 23 in the up-and-down direction.

In addition, the shaft assembly 37 is held by the clamp jig 38 in order to block the pulley space 19 by the cap 20.

Moreover, an opening surface 39 in which the jig space 23 opens is formed below an upper end of the main body part 31. The opening surface 39 becomes a contacting surface where a lower end of the pulley 8 contacts when the cylindrical jig 22 and the pulley 8 are contacted in the up-and-down direction (the opening surface 39 is hereafter called the contacting surface 39).

Then, a space formed in the upper side of the contacting surface 39 becomes a pulley accommodation space 40 in which the lower part of the pulley 8 is accommodated. In addition, the pulley accommodation space 40 is tapered toward the upper side (expanded in the radial direction) in the upper side, and by a tapered structure, the lower part of the pulley 8 is drawn so as to cancel an axial gap between the cylindrical jig 22, and accommodated in the pulley accommodation space 40.

Moreover, by contacting mutually the lower end of the pulley 8 and the contacting surface 39, an operation space 42 where the pulley space 19 and the jig space 23 are combined can be sealed from the open air.

Therefore, the operation space 42 can be decompressed to pressure lower than atmospheric pressure, or can be increased to pressure higher than atmospheric pressure.

Here, the pulley space 19 is expanded stepwise in the radial direction at the lower end of the pulley 8, and opens towards the lower side.

That is, the pulley space 19 is divided into two areas defined by a horizontal step 43, and the cap 20 is press-fit into a region having a larger diameter below the step 43 (hereafter, a part of the pulley space 19 where the region having a larger diameter below the step 43 may be called a cap-press-fit region 44).

In addition, the engaging part 34 is formed in a circular shape so that a lower part of the main body part 31 and an upper side of the guide part 33 are connected horizontally.

The receiving member 24 is unified with the sliding shaft part 32 supported slidably by the guide part 33, and since the sliding shaft part 32 slides relative to the guide part 33, the sliding shaft part 32 is movable relative to the cylindrical jig 22 in the up-and-down direction.

Moreover, the receiving member 24 has a smaller diameter than the cap 20, and is unified with an upper end of the sliding shaft part 32.

Here, the receiving member 24 has a main body part 46 that engages with the engaging part 34, and a raising part 47 that rises from the main body part 46 to the upper side. The raising part 47 has a smaller diameter than the main body part 46.

Moreover, the cap 20 is received in the receiving member 24 by being placed on an upper end side of the raising part 47.

Therefore, in the jig space 23 below (back side) the cap 20, an upper side formed by the raising part 47 is swollen to the inner circumference side than a lower part formed by the main body part 46.

Moreover, a contacting region 48 that contacts with the receiving member 24 and a non-contacting region 49 that does not contact with the receiving member 24 are formed on the back side of the cap 20, and the contacting region 48 is surrounded by the non-contacting region 49.

The driving means 25 is a well-known driving force generating device that generates driving force by oil pressure or air pressure, and drives the cylindrical jig 22 and the receiving member 24 to the upper side, for example.

Here, when a means that drives at least one of the cylindrical jig 22 and the shaft assembly 37 to make the cylindrical jig 22 and the shaft assembly 37 approach is defined as the first driving means, and a means that drives at least one of the receiving member 24 and the shaft assembly 37 to make the receiving member 24 and the shaft assembly approach is defined as the second driving means, the driving means 25 has functions of both the first and second driving means.

Moreover, the cylindrical jig 22, the receiving member 24 and the sliding shaft part 32 are accommodated in a cup-shaped accommodating jig 51. A lower end of the sliding shaft part 32 is fixed to a lower base part 51a of the accommodating jig 51, and the coil spring 28 is disposed between the lower base part 51a and the engaging part 34 of the cylindrical jig 22 so that the coil spring 28 stretches in the up-and-down direction.

Further, the driving means 25 provides driving force upwardly to the accommodating jig 51.

Therefore, driving force is transmitted upwardly to the cylindrical jig 22 through the accommodating jig 51 and the coil spring 28.

Moreover, driving force is mainly transmitted upwardly to the receiving member 24 through the accommodating jig 51 and the sliding shaft part 32.

The sucking means 27 is a well-known vacuum pump, for example, and sucks gas from the operation space 42 through the passage 26 leading to the jig space 23 so that the operation space 42 is decompressed to pressure lower than atmospheric pressure.

Here, the passage 26 is formed so that it passes through the accommodating jig 51, the sliding shaft part 32 and the receiving member 24. The passage 26 opens to the outer circumference side of the main body part 46 of the receiving member 24 and is communicated to the jig space 23, for example.

Therefore, the sucking means 27 sucks the gas in the to operation space 42 from under side (back side) of the cap 20.

The coil spring 28 is disposed between the lower base part 51a of the accommodating jig 51 and the engaging part 34 of the cylindrical jig 22, and it presses the cylindrical jig 22 to the upper side so that the engaging part 34 engages with the main body part 46 of the receiving member 24.

Therefore, during the cylindrical jig 22 and the pulley 8 are separated, the cylindrical jig 22 and the receiving member 24 are engaged unitarily and move to the upper side.

Moreover, the coil spring 28 moves to the upper side with the cylindrical jig 22 and the receiving member 24 without being compressed additionally during the period when the cylindrical jig 22 and the receiving member 24 are moving to the upper side unitarily.

Furthermore, the receiving member 24 parts from the cylindrical jig 22 and moves to the upper side, and will not be engaged with the receiving member 24 and the cylindrical jig 22 when the cylindrical jig 22 contacts to the pulley 8 and it becomes impossible for the cylindrical jig 22 to move to the upper side.

Moreover, the upper end of the coil spring 28 is fixedly supported by the engaging part 34 while additionally compressed to the upper side by the lower base part 51a while the receiving member 24 is being separated from the cylindrical jig 22 and is moving to the upper side, hence a part of the driving force is stored as stress.

Furthermore, when the receiving member 24 moves to the upper side and the cap 20 is press-fit into the pulley 8, the receiving member 24 is no longer able to move to the upper side, thus it stops. The coil spring 28 is compressed to the utmost at this time.

That is, the coil spring 28 is compressed into the upper side and increases the amount of accumulated stress during the period from the cylindrical jig 22 and the pulley 8 are contacted until the cap 20 is press-fit into the pulley 8.

Moreover, the manufacturing device 18 is equipped with a gas supplying means 53 that supplies the open air into the jig space 23, and is able to increase the pressure in the operation space 42 decompressed by the sucking means 27 to atmospheric pressure again.

In addition, the gas supplying means 53 is a valve gear that establishes and breaks communication between the passage 26 and the open air, for example.

Therefore, for example, when supplying air into the operation space 42 after the press-fitting of the cap 20, the air can be supplied only into the jig space 23.

Method of Manufacturing the Embodiment

The method of manufacturing the rotating electrical machine 1 of the embodiment is explained using FIG. 2 to FIG. 4.

First, the method of manufacturing the rotating electrical machine has a preparation step, a main step, and a post-treatment step.

The preparation step accommodates the cap 20 in the jig space 23 while separates the operation space 42 from the open air by bringing the pulley 8 and the cylindrical jig 22 contact in the up-and-down direction.

The main step decompresses the operation space 42 to the pressure lower than atmospheric pressure, and moves the cap 20 to the upper side in the decompressed operation space 42 to press-fit the cap 20 into a cap-press-fit region 44.

The post-treatment step supplies the open air into the jig space 23 after press-fitting the cap 20 into the pulley 8.

The preparation step is divided into a first preparation step that accommodates the cap 20 in the jig space 23 and arranges the shaft assembly 37 in the upper side of the cylindrical jig 22, and a second preparation step that brings the cylindrical jig 22 and the pulley 8 contacted in the up-and-down direction.

In the first preparation step, the cap 20 is accommodated in the jig space 23 by putting the cap 20 on the receiving member 24, and the shaft assembly 37 is arranged in the upper side of the cylindrical jig 22 by holding the shaft assembly 37 with the clamp jig 38, and moving it.

Moreover, the shaft assembly 37 is arranged in the upper side of the cylindrical jig 22 so that the opening of the jig space 23 faces the opening of the pulley space 19 in the up-and-down direction.

In the second preparation step, by driving the accommodating jig 51 to the upper side by the driving means 25, the cylindrical jig 22 and the receiving member 24 are moved to the upper side as a unit that brings the cylindrical jig 22 and the pulley 8 to be contacted in the up-and-down direction.

At this time, the lower part of the pulley 8 is accommodated in the pulley accommodation space 40, and the lower end of the pulley 8 contacts to the contacting surface 39, hence the operation space 42 is sealed from the open air.

The main step is divided into a decompression step of decompressing the operation space 42 to a pressure lower than atmospheric pressure, and a press-fitting step of press-fitting the cap 20 into the cap-press-fit region 44.

In the decompression step, gas is sucked from the operation space 42 by the sucking means 27, and the operation space 42 is decompressed to the pressure lower than atmospheric pressure.

At this time, the sucking means 27 sucks the gas in the operation space 42 from under side (back side) of the cap 20.

At the press-fitting step, by driving the accommodating jig 51 further upwards using the driving means 25, in the decompressed operation space 42, the receiving member 24 is parted from the cylindrical jig 22 and moved to the further upper side, hence the cap 20 is press-fit into the cap-press-fit region 44.

At this time, the coil spring 28 is additionally compressed in order to store the part of driving force as stress after the cylindrical jig 22 contacts to the pulley 8, and also during the period until the cap 20 is press-fit by having the accommodating jig 51 driven to the upper side.

In the post-treatment step, the open air is supplied into the operation space 42 by the gas supplying means 53.

At this time, the operation space 42 is divided into the jig space 23 and the pulley space 19 air-tightly with the cap 20 press-fit into the pulley 8.

Therefore, the open air is supplied only into the jig space 23, and only the pressure in the jig space 23 is increased to atmospheric pressure.

Effects of the Embodiment

The method of manufacturing the rotating electrical machine 1 of the embodiment includes the preparation step that accommodates the cap 20 in the jig space 23 while sealing the operation space 42 from the open air by bringing the pulley 8 and the cylindrical jig 22 contact in the up-and-down direction, and the main step that decompresses the operation space 42 to pressure lower than atmospheric pressure, and moves the cap 20 to the upper side in the decompressed operation space 42 to press-fit the cap 20 into a cap-press-fit region 44.

Reaction force acts on the cap 20 toward the lower side in connection with the pressure increase of the pulley space 19 when the cap 20 moves to the upper side and approaches to the pulley space 19. This reaction force becomes larger as the cap 20 approaches the pulley space 19.

In addition, there is a possibility that the cap 20 inclines or misaligns in an axial direction by an action of the reaction force.

Therefore, the operation space 42 is sealed and decompressed to the pressure lower than atmospheric pressure.

Then, the cap 20 is press-fit into the cap-press-fit region 44 in the operation space 42 under decompression.

By this, an inclination and a misalignment in the axial direction of the cap 20 by the action of the reaction force can be suppressed since the reaction force acting on the cap 20 can be weakened compared with the case where the cap 20 is press-fit under atmospheric pressure. Therefore, the press-fit-state of the cap 20 can be stabilized.

The method of manufacturing the rotating electrical machine 1 further includes the post-treatment step that supplies a gas having pressure higher than atmospheric pressure into the jig space 23 after press-fitting the cap 20 into the cap-press-fit region 44.

After press-fitting the cap 20, it is difficult to separate the cylindrical jig 22 and the shaft assembly 37 because suction force acting between the cylindrical jig 22 and the pulley 8 when the operation space 42 is in a decompression state lower than atmospheric pressure.

Therefore, after press-fitting the cap 20, the open air is supplied into the jig space 23 among the operation space 42, and the pressure of the jig space 23 is increased.

By this, the cylindrical jig 22 and the shaft assembly 37 are promptly separable after press-fitting the cap 20 because the decompression state of the jig space 23 is canceled and the suction force no longer acts between the cylindrical jig 22 and the pulley 8.

Moreover, a contacting region 48 that contacts with the receiving member 24 and a non-contacting region 49 that does not contact with the receiving member 24 are formed on the back side of the cap 20, and the contacting region 48 is surrounded by the non-contacting region 49.

The sucking means 27 sucks the gas in the operation space 42 from the back side of the cap 20.

Thereby, the operation space 42 can be decompressed smoothly since a channel for decompressing suction can be certainly formed in the back side of the cap 20.

Moreover, a flow of the gas accompanying the decompressing suction on the front side of the cap 20 becomes an upper stream side while the back side thereof becomes a lower stream side.

Then, a contacting force corresponding to an area of the non-contact domain 49 acts between the cap 20 and the receiving member 24, thus a position and a posture of the cap 20 become stabilized to the receiving member 24.

Therefore, the press-fit-state of the cap 20 can be stabilized further.

Furthermore, the pressurization power by the open air supplied into the jig space 23 in the post-treatment step can be made to act effectively to the cap 20 by surrounding the contact region 48 by the non-contact region 49.

That is, when the open air is supplied into the jig space 23 after press-fitting the cap 20, the pressurization power will act on the cap 20 toward the upper side corresponding to the area of the non-contact region 49.

Therefore, the cap 20 and the receiving member 24 can be separated promptly, and as a result, the cylindrical jig 22 and the shaft assembly 37 can be separated more promptly.

Moreover, the diameter of the jig space 23 is slightly larger than the diameter of the outer circumference of the cap 20 so that in-/outflow of the gas becomes possible between the front and the back side of the cap 20.

Thereby, the position and the posture of the moving cap 20 in the operation space 42 can be stabilized while the gas can be passed between the front and the back side of the cap 20 without inconvenience and the decompressing suction can be performed.

Furthermore, the manufacturing device 18 has the coil spring 28 in which the driving force of the driving means 25 can be stored as stress.

The coil spring 28 is compressed additionally and increases the amount of accumulated stress during the period from the cylindrical jig 22 contacting the pulley 8 until the cap 20 is press-fit into the pulley 8.

Thereby, a shock accompanying a contact of the cylindrical jig 22 and the pulley 8, and a shock accompanying the press-fitting of the cap 20 into the pulley 8 can be eased.

Moreover, a time margin can be set to a manufacturing step according to the compression time of the coil spring 28.

[Modification]

The manufacturing device 18 and the method of manufacturing the rotating electrical machine 1 are not limited to modes of the present embodiment, and various modifications can be considered.

For example, according to the manufacturing device 18 and the method of manufacturing in the embodiment, although the driving means 25 has a function of both first and second driving means, and the cylindrical jig 22 is contacted to the pulley 8 or the cap 20 is press-fit into the pulley 8 by moving both the cylindrical jig 22 and the receiving member 24 to the upper side, it is not limited to such a mode.

For example, the function of the first and second driving means may be separated, and a driving force generating device that generates the driving force to which the cylindrical jig 22 is moved, and a driving force generating device that generates the driving force to which the receiving member 24 is moved may be set individually.

Moreover, the shaft assembly 37 may be moved to the lower side for contacting the cylindrical jig 22 and the pulley 8, and the shaft assembly 37 may be moved to the lower side for press-fitting the cap 20 into the pulley 8.

Moreover, according to the manufacturing equipment 18 of the embodiment, although the sliding shaft part 32 is unified with the accommodation jig 51, the sliding shaft part 32 and the accommodation jig 51 may be provided separately so that the sliding shaft part 32 and the accommodation jig 51 can be attached/detached.

Moreover, according to the manufacturing device 18 of the embodiment, although the gas supplying means 53 increases the pressure in the jig space 23 to atmospheric pressure by supplying in the open air, a gas with higher pressure than atmospheric pressure may be supplied into the jig space 23.

Furthermore, according to the manufacturing device 18 of the embodiment, although the diameter of the jig space 23 is formed slightly larger than the diameter of the outer circumference of the cap 20 so that in-/outflow of the gas between the front side and the back side of the cap 20 become possible, a composition to which in-/outflow of the gas between the front side of the cap 20 and the back side is not limited to such a mode.

Figure 5:
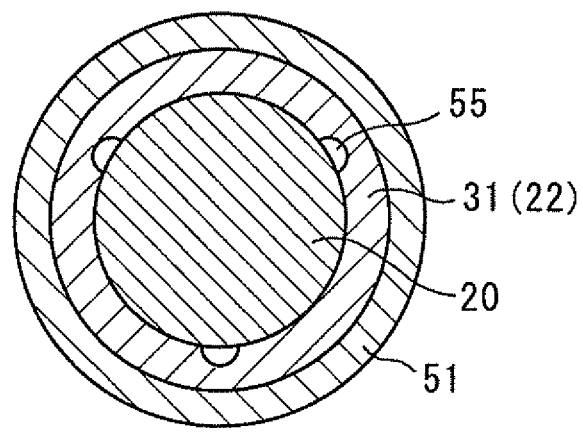
FIG. 5 shows a sectional view taken along a line A-A of FIG. 2A in a modification.

For example, as shown in FIG. 5, a plurality of slots 55 parallel to the up-and-down direction may be formed on an inner circumference surface of the main body part 31 at equal angle intervals so that the gas flows in/out between the front side and the back side of the cap 20.

What is claimed:

1. A method of manufacturing a rotating electrical machine that has a pulley fastened on one axial end of a shaft,
    the pulley has an approximately cylindrical pulley space that opens on one axial end, and
    the pulley space is covered by a plate-like cap,
    the method comprises steps of:
    a preparation step that accommodates the cap in a jig space formed so as to have an opening by a prescribed jig while bringing the jig and the pulley in contact so that an operation space where the pulley space and the jig space are combined is sealed, and
    a main step that decompresses the operation space to a pressure lower than atmospheric pressure, moves the cap towards the pulley space in the decompressed operation space, and press-fits the cap into the pulley.

2. The method of manufacturing the rotating electrical machine according to claim 1,
the method further comprises a step of:
a post-treatment step that supplies a gas that has pressure higher than atmospheric pressure into the jig space after press-fitting the cap into the pulley.

* * * * *